United States Patent
Baldovino et al.

(10) Patent No.: US 11,208,080 B2
(45) Date of Patent: Dec. 28, 2021

(54) MANIFOLD FOR VEHICLE SENSOR CLEANING

(71) Applicant: Ford Global Technologies, LLC, Dearborn, MI (US)

(72) Inventors: Segundo Baldovino, Novi, MI (US); Venkatesh Krishnan, Canton, MI (US); Ashwin Arunmozhi, Canton, MI (US); Raghuraman Surineedi, Dearborn, MI (US); Ashley Lucas, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 326 days.

(21) Appl. No.: 16/416,786

(22) Filed: May 20, 2019

(65) Prior Publication Data

US 2020/0369245 A1 Nov. 26, 2020

(51) Int. Cl.
*B60S 1/52* (2006.01)
*B60S 1/48* (2006.01)
*B60S 1/50* (2006.01)

(52) U.S. Cl.
CPC .. *B60S 1/52* (2013.01); *B60S 1/50* (2013.01)

(58) Field of Classification Search
CPC .................. B60S 1/52; B60S 1/56; B60S 1/48
See application file for complete search history.

(56) References Cited

U.S. PATENT DOCUMENTS

| 3,134,395 | A | | 5/1964 | Glasgow | |
|---|---|---|---|---|---|
| 3,459,221 | A | * | 8/1969 | Axelrod | F16K 11/22 137/883 |
| 3,727,714 | A | * | 4/1973 | Ishikawa | B60K 31/08 180/177 |
| 5,605,173 | A | | 2/1997 | Arnaud | |
| 2006/0037655 | A1 | * | 2/2006 | Beltran | F16K 11/0876 137/625.46 |

FOREIGN PATENT DOCUMENTS

| KR | 101553528 B1 | 9/2015 | |
|---|---|---|---|
| WO | WO-2020210450 A1 * | 10/2020 | ............. B60S 1/481 |

* cited by examiner

*Primary Examiner* — Michael D Jennings
(74) *Attorney, Agent, or Firm* — Frank A. MacKenzie; Bejin Bieneman PLC

(57) ABSTRACT

A cleaning system includes a straight pipe defining an axis, an inlet fluidly connected to the pipe and in line with the axis, and at least three outlets fluidly connected to and elongated from the pipe. The outlets extend parallel to each other and transverse from the pipe. The pipe has an increasing cross-sectional area along the axis from the outlet closest to the inlet to the outlet farthest from the inlet.

19 Claims, 4 Drawing Sheets

MANIFOLD FOR VEHICLE SENSOR CLEANING

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by obstructions, e.g., dust, snow, insects, etc.

DETAILED DESCRIPTION

Figure 1:
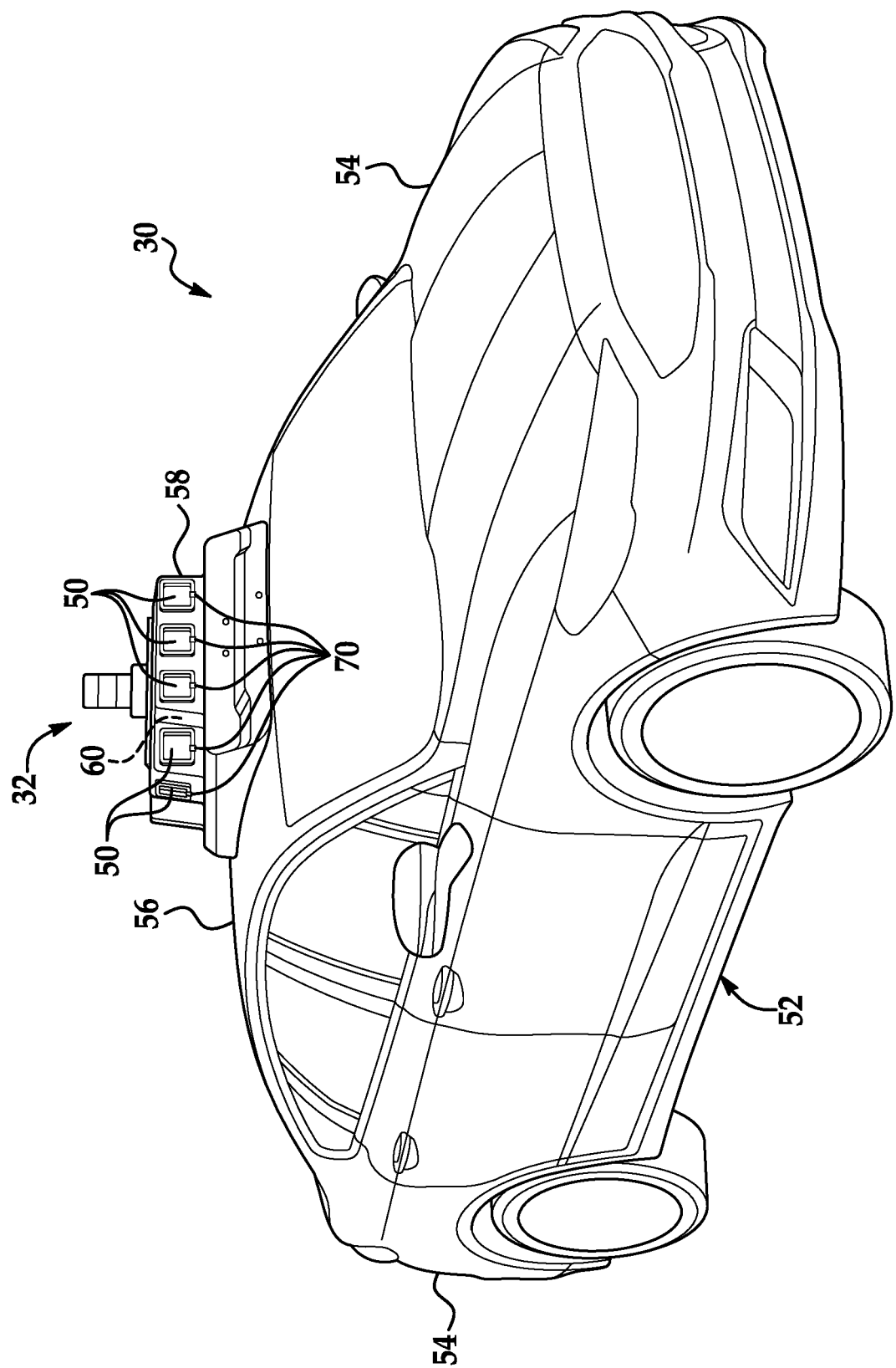
FIG. 1 is a perspective view of an example vehicle including a sensor assembly.

A cleaning system includes a straight pipe defining an axis, an inlet fluidly connected to the pipe and in line with the axis, and at least three outlets fluidly connected to and elongated from the pipe. The outlets extend parallel to each other and transverse from the pipe. The pipe has an increasing cross-sectional area along the axis from the outlet closest to the inlet to the outlet farthest from the inlet.

The cleaning system may further include at least three solenoid valves each controlling flow through one of the outlets. The solenoid valves may be independently actuatable.

The pipe may have a circular cross-section. The diameter of the circular cross-section may continuously increase from the outlet closest to the inlet to the outlet farthest from the inlet.

Cross-sectional areas of the outlets may be substantially equal to each other.

The at least three outlets may include at least five outlets.

The outlets may be arranged in series along the pipe with each outlet equally spaced from the consecutive outlets.

The pipe may be sealed other than the inlet and the outlets.

The outlets may extend perpendicular to the pipe.

The pipe may include a notch between two consecutive outlets along the axis. An axial section of the pipe including the notch may have a smaller cross-sectional area than adjacent axial sections of the pipe.

The pipe may include an outer wall, and the notch may extend inward toward the axis from the outer wall.

The notch may have a curved shape along a direction parallel to the axis.

The notch may be a first notch. The at least three outlets may include a first outlet closest to the inlet, a second outlet adjacent to the first outlet, and a third outlet adjacent to the second outlet. The first notch may be between the first outlet and the second outlet along the axis. The pipe may include a second notch between the second outlet and the third outlet along the axis. The at least three outlets may include a fourth outlet adjacent the third outlet, and the pipe may include a third notch between the third outlet and the fourth outlet along the axis. The pipe may include a first longitudinal section encompassing a first portion of a cross-section of the pipe and a second longitudinal section encompassing a second portion of the cross-section of the pipe opposite the first portion of the cross-section of the pipe. The outlets may extend from the first longitudinal section, and the first longitudinal section may include the notches. The second longitudinal section may include a fourth notch. The fourth notch may be between the third outlet and the fourth outlet along the axis.

The cleaning system may further include a pump fluidly connected to the inlet.

With reference to the Figures, a cleaning system 32 for a vehicle 30 includes a straight pipe 34 defining an axis A, an inlet 36 fluidly connected to the pipe 34 and in line with the axis A, and at least three outlets 38, 40, 42, 44, 46, 48 fluidly connected to and elongated from the pipe 34. The outlets 38, 40, 42, 44, 46, 48 extend parallel to each other and transverse from the pipe 34. The pipe 34 has an increasing cross-sectional area along the axis from the outlet 38 closest to the inlet 36 to the outlet 48 farthest from the inlet 36.

The increasing cross-sectional area of the pipe 34, along with other features described in more detail below, allow the cleaning system 32 to provide an even flow rate and pressure through the outlets 38, 40, 42, 44, 46, 48. The targets for which the outlets 38, 40, 42, 44, 46, 48 supply fluid can thus receive a consistent and predictable supply of fluid. Moreover, the cleaning system 32 provides for a compact packaging of components, providing greater design flexibility for other components of the vehicle 30.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems based at least in part on data received from sensors 50. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 52. The vehicle 30 may be of a unibody construction, in which a frame and the body 52 of the vehicle 30 are a single component. The vehicle 30 may, alternatively, be of a body-on-frame construction, in which the frame supports the body 52 that is a separate component from the frame. The frame and body 52 may be formed of any suitable material, for example, steel, aluminum, etc.

The body 52 includes body panels 54, 56 partially defining an exterior of the vehicle 30. The body panels 54, 56 may present a class-A surface, e.g., a finished surface exposed to view by a customer and free of unaesthetic blemishes and defects. The body panels 54, 56 include, e.g., a roof 56, etc.

A housing 58 for the sensors 50 is attachable to the vehicle 30, e.g., to one of the body panels 54, 56 of the vehicle 30, e.g., the roof 56. For example, the housing 58 may be shaped to be attachable to the roof 56, e.g., may have a shape matching a contour of the roof 56. The housing 58 may be attached to the roof 56, which can provide the sensors 50 with an unobstructed field of view of an area around the vehicle 30. The housing 58 may be formed of, e.g., plastic or metal.

The housing 58 may enclose and define a cavity 60. One or more of the body panels 54, 56, e.g., the roof 56, may partially define the cavity 60, or the housing 58 may fully enclose the cavity 60. The housing 58 may shield contents of the cavity 60 from external elements such as wind, rain, debris, etc.

The sensors 50 are disposed in the cavity 60 of the housing 58. The sensors 50 may detect the location and/or orientation of the vehicle 30. For example, the sensors 50 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 50 may detect the external world, e.g., objects and/or characteristics of surroundings of the vehicle 30, such as other vehicles, road lane markings, traffic lights and/or signs, pedestrians, etc. For example, the sensors 50 may include radar sensors, scanning laser range finders, light detection and ranging (LIDAR) devices, and image processing sensors such as cameras. The sensors 50 may include communications devices, for example, vehicle-to-infrastructure (V2I) or vehicle-to-vehicle (V2V) devices.

Figure 2:
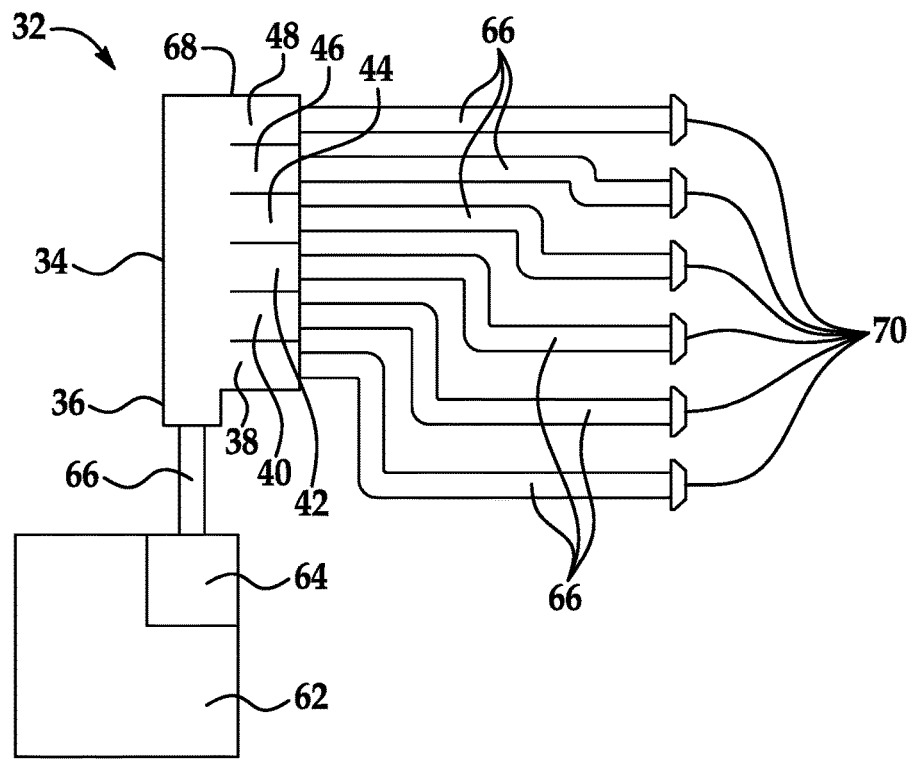
FIG. 2 is a diagram of a cleaning system for the sensor assembly.

With reference to FIG. 2, the cleaning system 32 of the vehicle 30 includes a reservoir 62, a pump 64, supply lines 66, a manifold 68, and nozzles 70. The reservoir 62, the pump 64, and the nozzles 70 are fluidly connected to each other (i.e., fluid can flow from one to the other) via the supply lines 66 and the manifold 68. The cleaning system 32 distributes washer fluid stored in the reservoir 62 to the nozzles 70. "Washer fluid" refers to any liquid stored in the reservoir 62 for cleaning. The washer fluid may include solvents, detergents, diluents such as water, etc.

The reservoir 62 is a tank fillable with liquid, e.g., washer fluid for window cleaning. The reservoir 62 may be disposed in a front of the vehicle 30, specifically, in an engine compartment forward of a passenger cabin. The reservoir 62 may store the washer fluid only for supplying the sensors 50 or also for other purposes, such as supply to the windshield. Alternatively, the reservoir 62 may be disposed in the cavity 60 of the housing 58.

The pump 64 may force the washer fluid through the supply lines 66 and the manifold 68 to the nozzles 70 with sufficient pressure that the washer fluid sprays from the nozzles 70. The pump 64 is fluidly connected to the reservoir 62. The pump 64 may be attached to or disposed in the reservoir 62.

The supply lines 66 extend from the pump 64 to the manifold 68 (i.e., to the inlet 36 of the manifold 68) and from the manifold 68 (i.e., the outlets 38, 40, 42, 44, 46, 48 of the manifold 68) to the nozzles 70. The supply lines 66 may be, e.g., flexible tubes.

As will be described in more detail below, the manifold 68 includes the pipe 34, the inlet 36, and the outlets 38, 40, 42, 44, 46, 48. The inlet 36 receives washer fluid from the pump 64 via the supply lines 66. The manifold 68 can direct washer fluid entering the inlet 36 to any combination of the outlets 38, 40, 42, 44, 46, 48, i.e., can independently block or open each of the outlets 38, 40, 42, 44, 46, 48. The manifold 68 can be disposed in the cavity 60 of the housing 58.

Each of nozzles 70 is fluidly connected to one of the outlets 38, 40, 42, 44, 46, 48 via one of the supply lines 66. The nozzles 70 are positioned to eject the washing fluid to clear obstructions from the fields of view of the sensors 50, e.g., aimed at the sensors 50 or at windows (not labeled) for the sensors 50. The pressure of the washer fluid exiting the nozzles 70 can dislodge or wash away obstructions that may impede the fields of view of the sensors 50.

Figure 3:
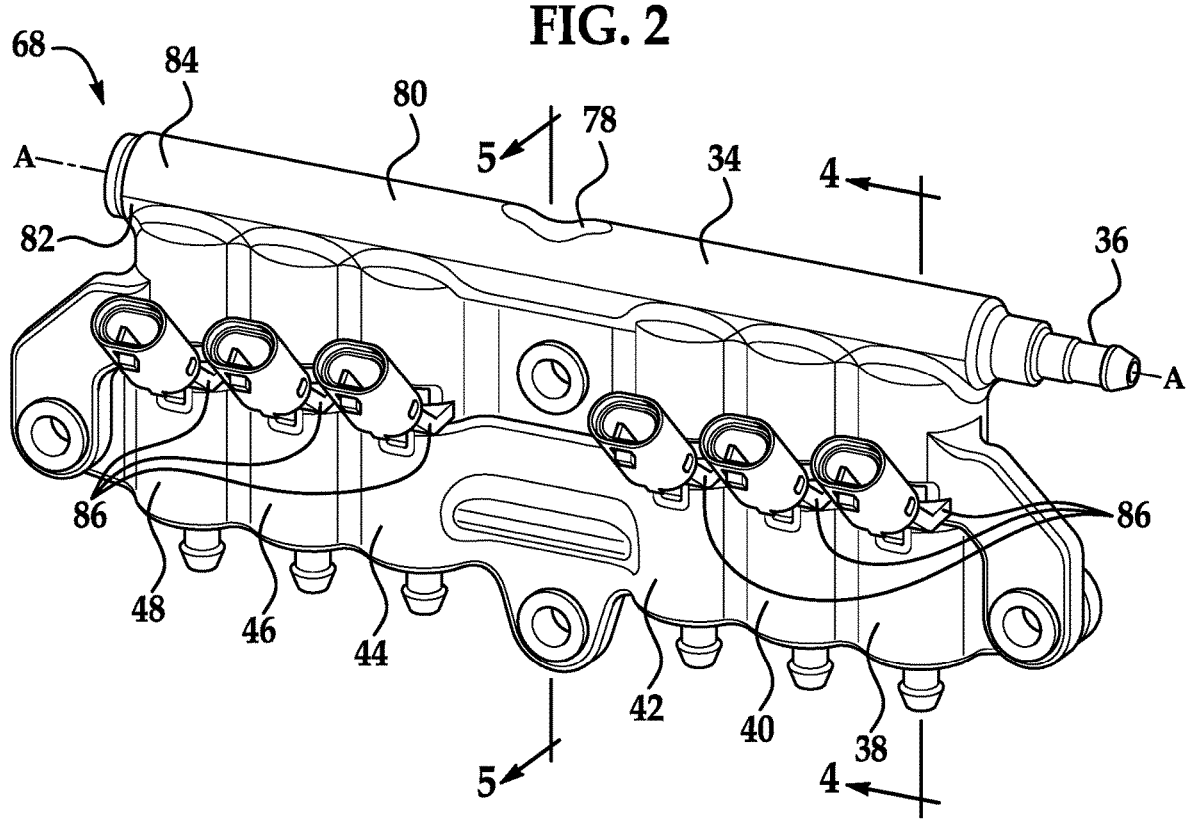
FIG. 3 is a perspective view of a manifold of the cleaning system.
Figure 5:
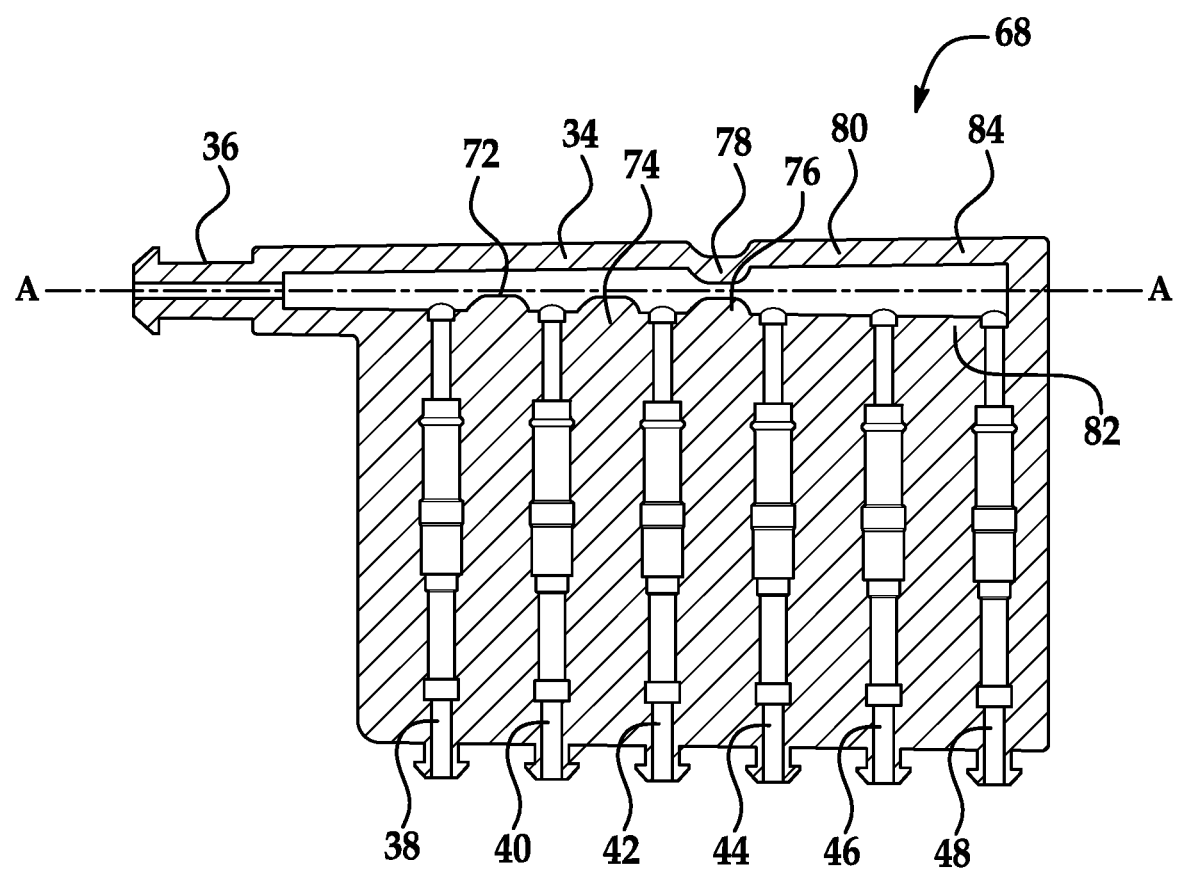
FIG. 5 is a cross-sectional side view of the manifold.

With reference to FIGS. 3 and 5, the manifold 68 includes the pipe 34, the inlet 36, and the outlets 38, 40, 42, 44, 46, 48. The manifold 68 can be formed, e.g., injection-molded, as a single unit.

The inlet 36 is fluidly connected to the pipe 34. The inlet 36 is in line with the axis A, i.e., the inlet 36 is elongated along the axis A, and a direction of flow defined by the inlet 36 is along the axis A. A diameter of the inlet 36 may be less than a smallest diameter of the pipe 34, as shown in FIG. 5.

The pipe 34 extends straight along the axis A and defines the axis A. The pipe 34 is sealed other than the inlet 36 and the outlets 38, 40, 42, 44, 46, 48; i.e., the only routes for fluid to enter or exit the pipe 34 is through the inlet 36 or one of the outlets 38, 40, 42, 44, 46, 48. The pipe 34 includes an outer wall 80. The outer wall 80 has a circular cross-section. The outer wall 80 is interrupted by the outlets 38, 40, 42, 44, 46, 48 and by notches 72, 74, 76, 78, as described below.

The pipe 34 includes a first longitudinal section 82 and a second longitudinal section 84. The first longitudinal section 82 encompasses a first portion of a cross-section of the pipe 34 that is elongated along the axis A; in other words, the first longitudinal section 82 encompasses a semicircular portion of the pipe 34 around the axis A. The second longitudinal section 84 encompasses a second portion of the cross-section of the pipe 34 opposite the first portion of the cross-section of the pipe 34; in other words, the second longitudinal section 84 encompasses the other semicircular portion of the pipe 34 around the axis A than the first longitudinal section 82. The first and second longitudinal sections 82, 84 completely constitute the pipe 34 and do not overlap. As shown in FIGS. 3 and 5, the first longitudinal section 82 is a bottom half of the pipe 34, and the second longitudinal section 84 is a top half of the pipe 34.

The manifold 68 includes at least three outlets 38, 40, 42, 44, 46, 48, e.g., at least five outlets 38, 40, 42, 44, 46, 48, e.g., six outlets 38, 40, 42, 44, 46, 48 as shown in the Figures, i.e., the first outlet 38, the second outlet 40, the third outlet 42, the fourth outlet 44, the fifth outlet 46, and the sixth outlet 48. The outlets 38, 40, 42, 44, 46, 48 are fluidly connected to and elongated from the pipe 34. For example, the outlets 38, 40, 42, 44, 46, 48 extend from the first longitudinal section 82 of the pipe 34. The outlets 38, 40, 42, 44, 46, 48 extend parallel to each other and transverse to the pipe 34, e.g., perpendicular to the pipe 34 as shown in the Figures. The outlets 38, 40, 42, 44, 46, 48 are spaced from each other along the axis A. The outlets 38, 40, 42, 44, 46, 48 are arranged in series along the pipe 34. The first outlet 38 is closest to the inlet 36 along the axis A; the second outlet 40 is adjacent the first outlet 38 and the third outlet 42; the third outlet 42 is adjacent the second outlet 40 and the fourth outlet 44; the fourth outlet 44 is adjacent the third outlet 42 and the fifth outlet 46; the fifth outlet 46 is adjacent the fourth outlet 44 and the sixth outlet 48; and the sixth outlet 48 is adjacent the fifth outlet 46 and is farthest from the inlet 36. Each of the outlets 38, 40, 42, 44, 46, 48 can be equally spaced from the consecutive outlets 38, 40, 42, 44, 46, 48, as shown in FIG. 5; for another example, outlets 38, 40, 42, 44, 46, 48 within subgroups can be equally spaced from each other, e.g., the first outlet 38, second outlet 40, and third outlet 42 can be equally spaced from each other, and the fourth outlet 44, fifth outlet 46, and sixth outlet 48 can be equally spaced from each other, as shown in FIG. 3. The cross-sectional areas of the outlets 38, 40, 42, 44, 46, 48 are substantially equal to each other, as shown in FIG. 5.

Figure 4:
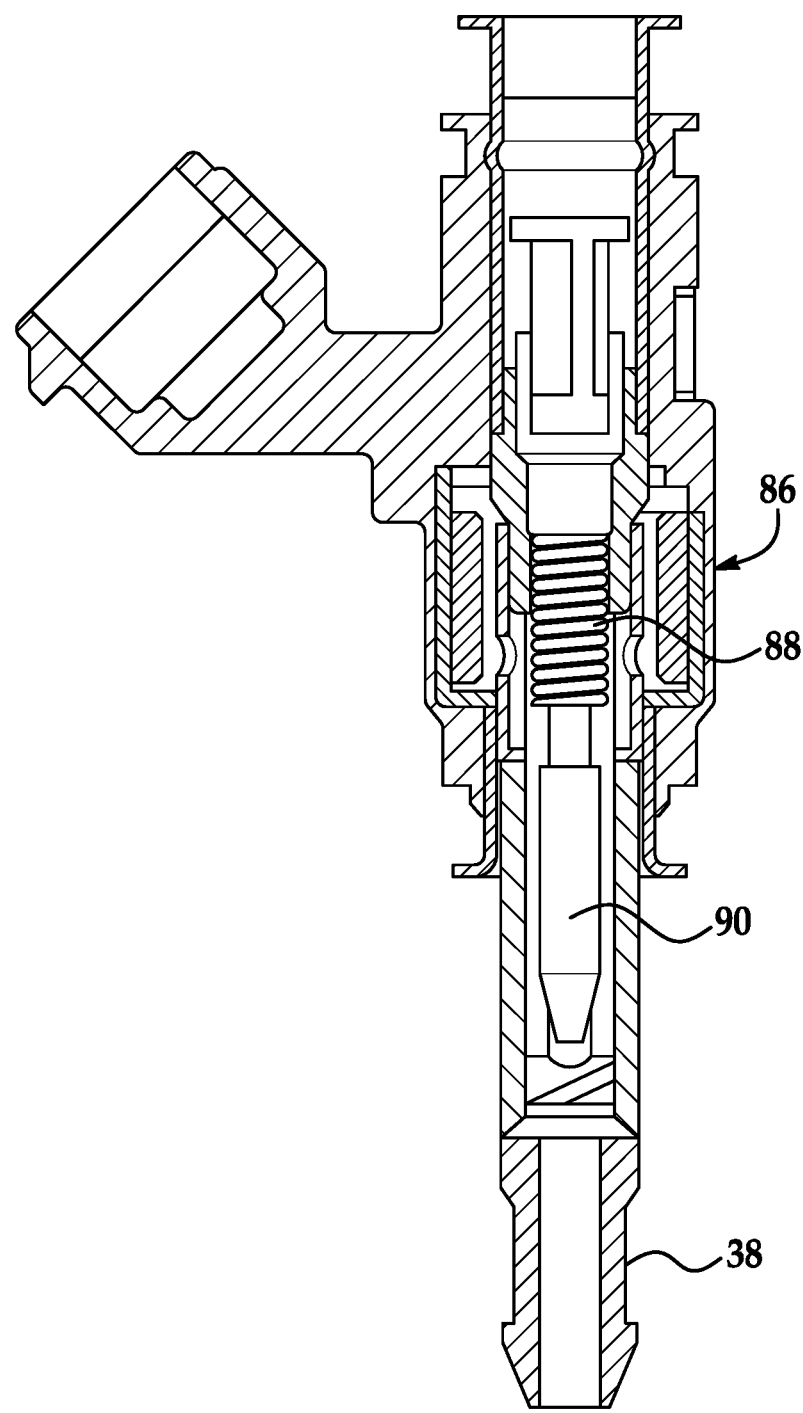
FIG. 4 is a cross-sectional view of an outlet of the manifold.

With reference to FIG. 4, the cleaning system 32 includes at least three solenoid valves 86, e.g., at least five solenoid valves 86, e.g., six solenoid valves 86 as shown in FIG. 3. Each solenoid valve 86 is positioned to control flow through a respective one of the outlets 38, 40, 42, 44, 46, 48. Each solenoid valve 86 is actuatable between an open position permitting flow through the respective outlet 38, 40, 42, 44, 46, 48 and a closed position blocking flow through the outlet 38, 40, 42, 44, 46, 48. The solenoid valves 86 are independently actuatable, i.e., can each be actuated without actuating the others. Each solenoid valve 86 includes a solenoid 88 and a plunger 90. Electrical current through the solenoid 88 generates a magnetic field, and the plunger 90 moves in response to changes in the magnetic field. Depending on its position, the plunger 90 permits or blocks flow through the respective outlet 38, 40, 42, 44, 46, 48.

With reference to FIG. 5, the pipe 34 includes the notches 72, 74, 76, 78, specifically, a first notch 72, a second notch 74, a third notch 76, and a fourth notch 78. The notches 72, 74, 76, 78 are positioned between consecutive outlets 38, 40, 42, 44, 46, 48 along the axis A. The first notch 72 is between the first outlet 38 and the second outlet 40 along the axis A; the second notch 74 is between the second outlet 40 and third outlet 42 along the axis A; and the third notch 76 and fourth notch 78 are between the third outlet 42 and the fourth outlet 44 along the axis A. The first longitudinal section 82 of the pipe 34 includes the first notch 72, the second notch 74, and the third notch 76. The second longitudinal section 84 includes the fourth notch 78.

The notches 72, 74, 76, 78 each have a curved shape along a direction parallel to the axis A. The notches 72, 74, 76, 78 bend inward from the outer wall 80 of the pipe 34 toward the axis A. Each axial section of the pipe 34 including one of the notches 72, 74, 76, 78 has a smaller cross-sectional area than adjacent axial sections of the pipe 34 lacking notches 72, 74, 76, 78. For example, the axial section of the pipe 34 including the first notch 72 has a cross-sectional area that is smaller than the cross-sectional area of the axial section of the pipe 34 including the first outlet 38 and than the cross-sectional area of the axial section of the pipe 34 including the second outlet 40. The positions and shapes of the notches 72, 74, 76, 78 cause more even flow and pressure through the outlets 38, 40, 42, 44, 46, 48.

The pipe 34 has an increasing cross-sectional area from the first outlet 38 to the sixth outlet 48. The cross-sectional area of the pipe 34 increases continuously from the first outlet 38 to the sixth outlet 48 except for the axial sections including the notches 72, 74, 76, 78. The pipe 34, e.g., the outer wall 80 of the pipe 34, has a circular cross-section, and the diameter of the circular cross-section increases from the first outlet 38 to the sixth outlet 48. The diameter of the circular cross-section of the pipe 34 (i.e., the internal diameter of the outer wall 80) increases continuously, i.e., without interruption, from the first outlet 38 to the sixth outlet 48. The generally increasing cross-sectional area of the pipe 34 causes more even flow and pressure through the outlets 38, 40, 42, 44, 46, 48.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first," "second," "third," "fourth," "fifth," and "sixth" are used throughout this document as identifiers and are not intended to signify importance or order. Many modifications and variations of the present disclosure are possible in light of the above teachings, and the disclosure may be practiced otherwise than as specifically described.

What is claimed is:

1. A cleaning system comprising:
    a straight pipe defining an axis;
    an inlet fluidly connected to the pipe and in line with the axis; and
    at least three outlets fluidly connected to and elongated from the pipe;
    wherein the outlets extend parallel to each other and transverse from the pipe;
    the pipe has an increasing cross-sectional area along the axis from the outlet closest to the inlet to the outlet farthest from the inlet; and
    the pipe includes a notch between two consecutive outlets along the axis.

2. The cleaning system of claim 1, further comprising at least three solenoid valves each controlling flow through one of the outlets.

3. The cleaning system of claim 2, wherein the solenoid valves are independently actuatable.

4. The cleaning system of claim 1, wherein the pipe has a circular cross-section.

5. The cleaning system of claim 4, wherein a diameter of the circular cross-section continuously increases from the outlet closest to the inlet to the outlet farthest from the inlet.

6. The cleaning system of claim 1, wherein cross-sectional areas of the outlets are substantially equal to each other.

7. The cleaning system of claim 1, wherein the at least three outlets include at least five outlets.

8. The cleaning system of claim 1, wherein the outlets are arranged in series along the pipe with each outlet equally spaced from the consecutive outlets.

9. The cleaning system of claim 1, wherein the pipe is sealed other than the inlet and the outlets.

10. The cleaning system of claim 1, wherein the outlets extend perpendicular to the pipe.

11. The cleaning system of claim 1, wherein an axial section of the pipe including the notch has a smaller cross-sectional area than adjacent axial sections of the pipe.

12. The cleaning system of claim 1, wherein the pipe includes an outer wall, and the notch extends inward toward the axis from the outer wall.

13. The cleaning system of claim 1, wherein the notch has a curved shape along a direction parallel to the axis.

14. The cleaning system of claim 1, wherein
    the notch is a first notch;
    the at least three outlets include a first outlet closest to the inlet, a second outlet adjacent to the first outlet, and a third outlet adjacent to the second outlet;

the first notch is between the first outlet and the second outlet along the axis; and the pipe includes a second notch between the second outlet and the third outlet along the axis.

15. The cleaning system of claim 14, wherein the at least three outlets include a fourth outlet adjacent the third outlet, and the pipe includes a third notch between the third outlet and the fourth outlet along the axis.

16. The cleaning system of claim 15, wherein the pipe includes a first longitudinal section encompassing a first portion of a cross-section of the pipe and a second longitudinal section encompassing a second portion of the cross-section of the pipe opposite the first portion of the cross-section of the pipe, the outlets extend from the first longitudinal section, and the first longitudinal section includes the notches.

17. The cleaning system of claim 16, wherein the second longitudinal section includes a fourth notch.

18. The cleaning system of claim 17, wherein the fourth notch is between the third outlet and the fourth outlet along the axis.

19. The cleaning system of claim 1, further comprising a pump fluidly connected to the inlet.

* * * * *